(12) United States Patent
Shaw et al.

(10) Patent No.: US 10,381,884 B2
(45) Date of Patent: Aug. 13, 2019

(54) MAGNETIC SELF-ALIGNING COIL CENTERING FOR WIRELESS CHARGING

(71) Applicant: Dell Products L.P., Round Rock, TX (US)

(72) Inventors: Timothy C. Shaw, Austin, TX (US); Benedict Tiong Chee Tay, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 15/636,269

(22) Filed: Jun. 28, 2017

(65) Prior Publication Data

US 2019/0006893 A1    Jan. 3, 2019

(51) Int. Cl.
*H02J 7/00* (2006.01)
*H02J 50/90* (2016.01)
*H02J 7/02* (2016.01)
*H02J 50/12* (2016.01)
*H01F 38/14* (2006.01)

(52) U.S. Cl.
CPC ............. *H02J 50/90* (2016.02); *H01F 38/14* (2013.01); *H02J 7/025* (2013.01); *H02J 50/12* (2016.02)

(58) Field of Classification Search
CPC .................................. H02J 50/90; H02J 50/12

USPC ......................................................... 320/108
See application file for complete search history.

(56) References Cited

U.S. PATENT DOCUMENTS

| | | | |
|---|---|---|---|
| 8,796,989 B2 | 8/2014 | Lee et al. | |
| 9,385,561 B2 | 7/2016 | Sayles | |
| 2009/0096413 A1* | 4/2009 | Partovi | H01F 5/003 320/108 |
| 2012/0146576 A1* | 6/2012 | Partovi | H01F 7/0252 320/108 |
| 2015/0162767 A1 | 6/2015 | Oh et al. | |
| 2016/0344244 A1 | 11/2016 | Li et al. | |
| 2018/0248406 A1* | 8/2018 | Bae | G04G 19/00 |
| 2018/0278099 A1* | 9/2018 | Hong | H02J 50/90 |

* cited by examiner

*Primary Examiner* — Suchin Parihar
(74) *Attorney, Agent, or Firm* — Baker Botts L.L.P.

(57) ABSTRACT

Systems and methods for magnetic self-aligning coil centering for wireless charging may include a charging device that may transmit power wirelessly to a portable device. The charging device may include a first magnet and a second magnet. When the portable device may be in proximity of the charging device, a first pole of the first magnet may create a first magnetic attraction force with a third magnet of the portable device, and the second pole of the second magnet may create a first magnetic repulsion force with the third magnet. When the portable device is placed adjacent to the charging device, the first magnetic attraction force and the first magnetic repulsion force may cause a first coil charging area of the charging device and a second coil charging area of the portable device to be aligned.

20 Claims, 14 Drawing Sheets

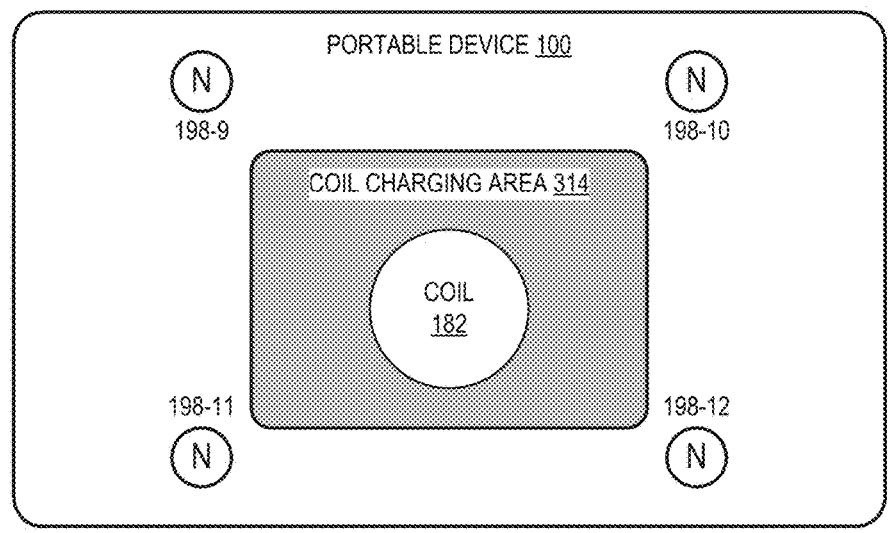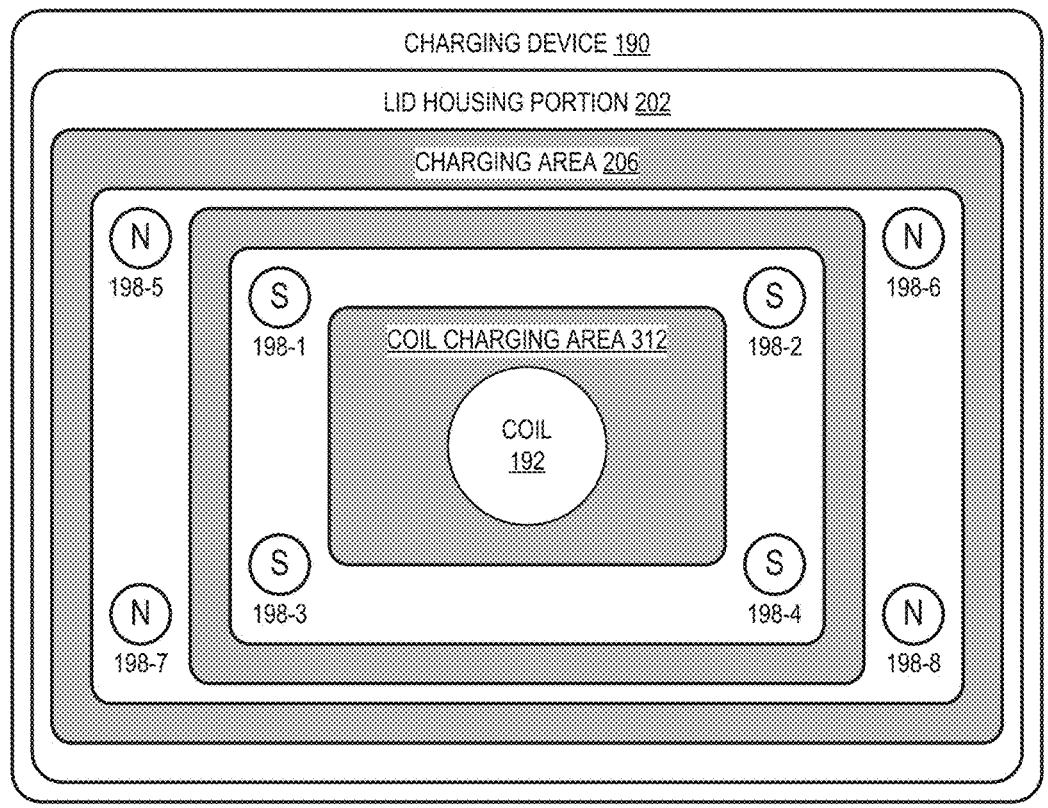
FIG. 3

MAGNETIC SELF-ALIGNING COIL CENTERING FOR WIRELESS CHARGING

BACKGROUND

Field of the Disclosure

This disclosure relates generally to information handling systems and, more particularly, to magnetic self-aligning coil centering for wireless charging.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and may utilize a charging device to wirelessly charge the rechargeable battery.

SUMMARY

In one aspect, a disclosed charging device may include a first induction coil that may transmit power wirelessly to a portable device that may include a second induction coil, a first charging surface that may have a first coil charging area that may be defined by the first induction coil, a first magnet that may have a first pole and a second pole and may be disposed at the first charging surface, and a second magnet that may have a first pole and a second pole and may be disposed at the first charging surface. When the portable device may be in proximity of the charging device, the first pole of the first magnet may create a first magnetic attraction force with a third magnet that may be disposed at a second charging surface of the portable device, and the second pole of the second magnet may create a first magnetic repulsion force with the third magnet. When the second charging surface of the portable device is placed adjacent to the first charging surface of the charging device, the first magnetic attraction force and the first magnetic repulsion force may cause the first coil charging area and a second coil charging area of the second charging surface to be aligned. The second coil charging area may be defined by the second induction coil.

In any of the disclosed embodiments of the charging device, the charging device may also include a fourth magnet that may have a first pole and a second pole and may be disposed at the first charging surface, and a fifth magnet that may have a first pole and a second pole and may be disposed at the first charging surface. When the portable device may be in proximity of the charging device, the first pole of the fourth magnet may create a second magnetic attraction force with the third magnet, and the second pole of the fifth magnet may create a second magnetic repulsion force with the third magnet. When the second charging surface of the portable device is placed adjacent to the first charging surface of the charging device, the second magnetic attraction force and the second magnetic repulsion force may provide additional magnetic forces that may cause the first coil charging area and the second coil charging area to be aligned.

In any of the disclosed embodiments of the charging device, the charging device may also include a fourth magnet that may have a first pole and a second pole and may be disposed at the first charging surface, and a fifth magnet that may have a first pole and a second pole and may be disposed at the first charging surface. When the portable device may be in proximity of the charging device, the first pole of the fourth magnet may create a second magnetic attraction force with a sixth magnet that may be disposed at the second charging surface of the portable device, and the second pole of the fifth magnet may create a second magnetic repulsion force with the sixth magnet. When the second charging surface of the portable device is placed adjacent to the first charging surface of the charging device, the second magnetic attraction force and the second magnetic repulsion force may provide additional magnetic forces that may cause the first coil charging area and the second coil charging area to be aligned.

In any of the disclosed embodiments of the charging device, when the portable device may be in proximity of the charging device, the second pole of the second magnet may create a second magnetic attraction force with a fourth magnet that may be disposed at the second charging surface of the portable device. When the second charging surface of the portable device is placed adjacent to the first charging surface of the charging device, the second magnetic attraction force may provide an additional magnetic force that may cause the first coil charging area and the second coil charging area to be aligned. The size of the third and fourth magnets may be less than the size of the first and the second magnets.

In any of the disclosed embodiments of the charging device, the first and the second magnets may be located at a front portion of the first charging surface of the charging device and the third magnet may be located at a respective front portion of the second charging surface of the portable device so that the first magnetic attraction force may provide an anti-tip magnetic attraction force when the portable device is adjacent to the first charging surface and a touch force may be applied to a display portion of the portable device when the display portion may be in an open position.

In any of the disclosed embodiments of the charging device, the first and the second magnets may be located at a front portion of the first charging surface of the charging device, the fourth and fifth magnets may be located at a back portion of the first charging surface of the charging device, the third magnet may be located at a respective front portion of the second charging surface of the portable device, and the sixth magnet may be located at a respective back portion of the second charging surface of the portable device so that the first and second magnetic attraction forces and the first and second magnetic repulsion forces may provide an increased magnetic steering torque that may cause the first coil charging area and the second coil charging area to be aligned.

In any of the disclosed embodiments of the charging device, the first, the second, and the third magnets may be spherical magnets that may have diametrical magnetic fields, and the first, the second, and the third magnets may be neodymium magnets.

In any of the disclosed embodiments of the charging device, one or more of the first and the second magnets may be electromagnets.

In any of the disclosed embodiments of the charging device, the size of the first magnet may be less than the size of the second magnet so that the first magnetic attraction force may be less than the first magnetic repulsion force.

In any of the disclosed embodiments of the charging device, the first charging surface of the charging device may include a surface bezel that may have geometric contours that may provide additional alignment adjustment based on a size of the portable device. The surface bezel may be a plastic bezel.

In another aspect, a disclosed portable device may include a second induction coil that may receive power wirelessly from a charging device that may include a first induction coil, a second charging surface that may have a second coil charging area that may be defined by the second induction coil, and a third magnet that may have a first pole and a second pole and may be disposed at the second charging surface. When the portable device may be in proximity of the charging device, the second pole of the third magnet may create a first magnetic attraction force with a first pole of a first magnet having the first pole and a second pole that may be disposed at a first charging surface of the charging device, and the third magnet may create a first magnetic repulsion force with a second pole of a second magnet that may have a first pole and the second pole that may be disposed at the first charging surface of the charging device. When the second charging surface of the portable device is placed adjacent to the first charging surface of the charging device, the first magnetic attraction force and the first magnetic repulsion force may cause a first coil charging area of the first charging surface and the second coil charging area to be aligned. The first coil charging area may be defined by the first induction coil.

In any of the disclosed embodiments of the portable device, when the portable device may be in proximity of the charging device, the third magnet may create a second magnetic attraction force with a first pole of a fourth magnet having the first pole and a second pole that may be disposed at the first charging surface, and the second pole of the third magnet may create a second magnetic repulsion force with a second pole of a fifth magnet that may have a first pole and the second pole that may be disposed at the first charging surface. When the second charging surface of the portable device is placed adjacent to the first charging surface of the charging device, the second magnetic attraction force and the second magnetic repulsion force may provide additional magnetic forces that may cause the first coil charging area and the second coil charging area to be aligned.

In any of the disclosed embodiments of the portable device, the portable device may also include a sixth magnet that may have a first pole and a second pole that may be disposed at the second charging surface of the portable device. When the portable device may be in proximity of the charging device, the sixth magnet may create a second magnetic attraction force with a first pole of a fourth magnet that may have the first pole and a second pole that may be disposed at the first charging surface, and the sixth magnet may create a second magnetic repulsion force with a second pole of a fifth magnet that may have a first pole and the second pole that may be disposed at the first charging surface. When the second charging surface of the portable device is placed adjacent to the first charging surface of the charging device, the second magnetic attraction force and the second magnetic repulsion force may provide additional magnetic forces that may cause the first coil charging area and the second coil charging area to be aligned.

In any of the disclosed embodiments of the portable device, the portable device may also include a fourth magnet that may be disposed at the second charging surface of the portable device. When the portable device may be in proximity of the charging device, the fourth magnet may create a second magnetic attraction force with the second pole of the second magnet. When the second charging surface of the portable device is placed adjacent to the first charging surface of the charging device, the second magnetic attraction force may provide an additional magnetic force that may cause the first coil charging area and the second coil charging area to be aligned. The size of the third and fourth magnets may be less than the size of the first and the second magnets.

In any of the disclosed embodiments of the portable device, the first and the second magnets may be located at a front portion of the first charging surface of the charging device and the third magnet may be located at a respective front portion of the second charging surface of the portable device so that the first magnetic attraction force may provide an anti-tip magnetic attraction force when the portable device is adjacent to the first charging surface and a touch force may be applied to a display portion of the portable device when the display portion may be in an open position.

In any of the disclosed embodiments of the portable device, the first and the second magnets may be located at a front portion of the first charging surface of the charging device, the fourth and fifth magnets may be located at a back portion of the first charging surface of the charging device, the third magnet may be located at a respective front portion of the second charging surface of the portable device, and the sixth magnet may be located at a respective back portion of the second charging surface of the portable device so that the first and second magnetic attraction forces and the first and second magnetic repulsion forces may provide an increased magnetic steering torque that may cause the first coil charging area and the second coil charging area to be aligned.

In any of the disclosed embodiments of the portable device, the first, the second, and the third magnets may be spherical magnets that may have diametrical magnetic fields. The first, the second, and the third magnets may be neodymium magnets.

In any of the disclosed embodiments of the portable device, one or more of the first and the second magnets may be electromagnets.

In any of the disclosed embodiments of the portable device, the size of the first magnet may be less than the size of the second magnet so that the first magnetic attraction force may be less than the first magnetic repulsion force.

In yet another aspect, a disclosed method for magnetic self-aligning coil centering for wireless charging may include, in a charging device that may include a first induction coil that may transmit power wirelessly to a portable device that may have a second induction coil, a first charging surface that may include a first coil charging area that may be defined by the first induction coil, a first magnet that may have a first pole and a second pole and may be disposed at the first charging surface, and a second magnet that may have a first pole and a second pole and may be disposed at the first charging surface, creating, by the first pole of the first magnet, a first magnetic attraction force with a third magnet that may be disposed at a second charging surface of the portable device, when the portable device may be in proximity of the charging device. The method may also include creating, by the second pole of the second magnet, a first magnetic repulsion force with the third magnet. The method may further include causing, by the first magnetic attraction force and the first magnetic repulsion force, the first coil charging area and a second coil charging area of the second charging surface may be aligned, when the second charging surface of the portable device is placed adjacent to the first charging surface of the charging device. The second coil charging area may be defined by the second induction coil.

BRIEF DESCRIPTION OF THE DRAWINGS

For a more complete understanding of the present invention and its features and advantages, reference is now made to the following description, taken in conjunction with the accompanying drawings, in which:

FIG. 3 is a block diagram of selected elements of an embodiment of placement of magnets in a charging device and a portable device;

DESCRIPTION

Figure 1:
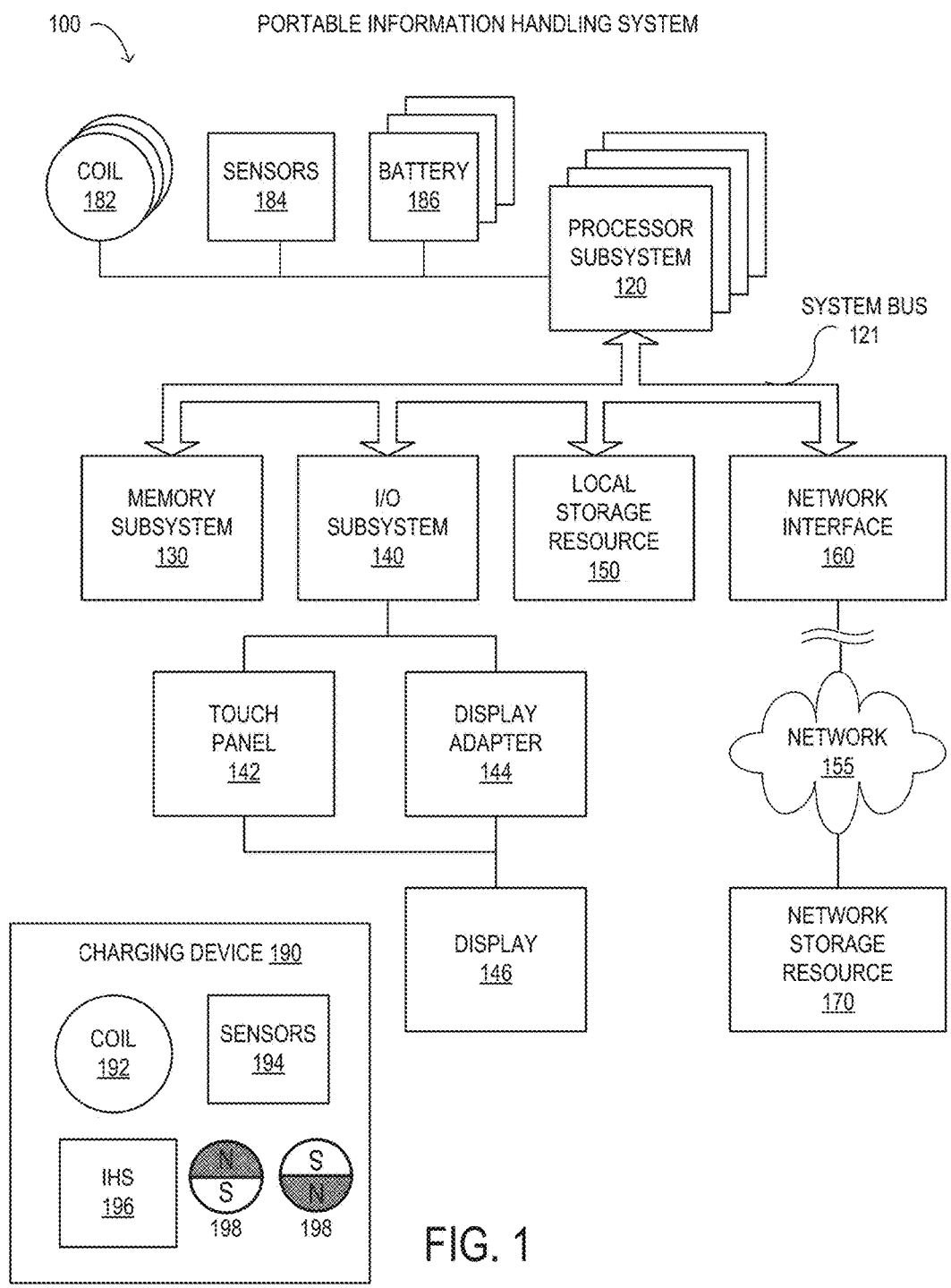
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4, 5, 6, 7A, 7B, 7C, 8, 9, 10, 11, 12, 13, 14, 15, and 16 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory subsystem 130, an I/O subsystem 140, a local storage resource 150, and a network interface 160. Also shown within information handling system 100 is one or more induction coils 182 for wireless power reception and transfer, one or more sensors 184, and one or more batteries 186 to provide power to portable information handling system 100 or one or more components of portable information handling system 100. Furthermore, portable information handling system 100 may be inductively coupled to a charging device 190 that incorporates various high efficiency features for use with portable information handling system 100, as disclosed herein. As shown, charging device 190 may be an external device to portable information handling system 100 which may be utilized to wirelessly charge the one or more batteries 186 of portable information handling system 100, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating. As shown, I/O subsystem 140 may comprise touch panel 142 and display adapter 144. Touch panel 142 may include circuitry for enabling touch functionality in conjunction with a display 146 that is driven by display adapter 144.

Sensors 184 may be one or more sensor devices that may include a thermal sensor device, an eddy current sensor device to provide eddy current information coils 182, a battery monitoring device to provide battery information of the one or more batteries 186, and a wireless communication device to communicate with a charging device, among other types of sensor devices. The battery information of the one or more batteries 186 may include a battery charging priority, a charge level of a battery, a charging efficiency of a battery, a health of a battery. A wireless communication device may be a Bluetooth device, an infrared device, a near field communication device, a Zigbee device, among other types of wireless communication devices. A processor of processor subsystem 120 of portable information handling system 100 may collect sensor feedback information from the one or more sensor devices of sensors 184 and provide the sensor feedback of portable information handling system 100 to charging device 190 via the wireless communication device, described in more detail below. Battery 186 may be a smart battery that may monitor battery charge levels, battery efficiency, and battery charging efficiency, among other battery characteristics. A portable information handling system may also be referred herein as a portable device.

Charging device 190 may include an induction coil 192, one or more sensor devices 194, an information handling system 196, and two or more magnets 198. Information handling system 196 may have similar components, functionality and structure as information handling system 100.

Magnets 198 may be spherical magnets that may have diametrical magnetic fields. Magnets 198 may also be neodymium magnets, amongst other types of magnets. Magnets 198 may have a first magnetic pole and a second magnetic pole, which are opposite magnetic poles. The first pole may be a north (N) magnetic pole or a south (S) magnetic pole, and the second pole may be an N magnetic pole or an S magnetic pole. When the first pole is an N magnetic pole, the second pole is S magnetic pole, and when the first pole is an S magnetic pole, the second pole is an N magnetic pole.

As will be described in further detail herein, a portable information handling system, may utilize charging devices to wirelessly transfer power from a charging device to the portable information handling system through electromagnetic inductive coupling of an induction coil of the charging device and an induction coil of the portable information handling system when the portable information handling system is on or near a charging surface of the charging device, which may be used to charge one or more batteries of the portable information handling system. Typical charging devices convert a voltage of a power supply into a high frequency alternating current (AC) that is sent to a transmitter induction coil of the charging device by a transmitter circuit. The AC current induces a time varying magnetic field in the transmitter induction coil. The AC current flowing within the transmitter induction coil induces a magnetic field which extends to a receiver induction coil of the portable information handling system when the portable information handling system is on or near a charging surface of the charging device. The magnetic field generates an AC current within the receiver induction coil of the portable information handling system. The power transmitted between the transmitter and receiver induction coils is also referred herein as magnetic or resonant coupling and is achieved by both induction coils resonating at the same frequency. The AC current flowing within the receiver induction coil is converted into direct current (DC) by a receiver circuit, which may be used to charge a battery.

The charging device may transmit power wirelessly to the portable information handling system by coupling the transmitter induction coil of the charging device and the receiver induction coil of the portable information handling system. The transmitter induction coil generates an induced electromagnetic field (EMF) into the adjacent receiver induction coil of the portable information handling system by mutual induction (M). As such, transmitter induction coil and the receiver induction coil are magnetically linked together by a common magnetic flux and will have the property of mutual inductance, which may be defined as the current flowing in one coil that induces a voltage in an adjacent coil. The charging efficiency of the charging device may depend on the amount of mutual inductance between the two induction coils.

The amount of mutual inductance that links the transmitter induction coil to the adjacent receiver induction coil and the charging efficiency of the charging device may depend on the axial alignment and the relative positioning of the two induction coils. When the adjacent receiver induction coil may be positioned next to the transmitter induction coil so that their physical distance apart may be small and the two coils may be axially aligned, then nearly all of the magnetic flux generated by the transmitter induction coil may interact with the coil turns of the receiver induction coil that may induce a relatively large EMF and therefore may produce a large mutual inductance value, which may result in a higher charging efficiency of the charging device.

When the transmitter induction coil and the adjacent receiver induction coil may be farther apart from each other, may be at different angles relative to each other, or may be axially misaligned, the amount of induced magnetic flux from the transmitter induction coil into the adjacent receiver induction coil may be weaker and may produce a smaller induced EMF and therefore a smaller mutual inductance value, which may result in a lower charging efficiency of the charging device. So the effect of mutual inductance and the charging efficiency may be very dependent upon the relative positions of the two induction coils and the axial alignment of the two induction coils.

The charging speed and efficiency of the charging device may depend on the position of the portable information handling system on the charging surface of the charging device and, in particular, the alignment and the position of the transmitter induction coil of the charging device relative to the alignment and the position of the receiver induction coil. When the positions of the transmitter and receiver induction coils are misaligned, the charging speed and efficiency of the charging device may be reduced. The transmitter and receiver induction coils may be misaligned when the portable information handling system may be placed adjacent to with the charging device in a misaligned position, where an inductor coil charging area of the portable information handling system may not be aligned with an induction coil charging area of the charging device, and the amount of overlap of the inductor coil charging areas may be minimal. This may occur when a user may not properly center the portable device on the charging device, the user may not be aware that one or both induction coil charging areas may be in an off center position in the device when placing the portable device on the charging device, the user may place the portable device in a position on the charging device with minimal overlap between the induction coil charging areas, amongst other sub-optimal placements of the portable device on the charging device.

Therefore, a charging device, for example, charging device 190, that may automatically align (auto-align) and center a transmitter induction coil of a charging device with a receiver induction coil of a portable information handling system during placement of the portable information handling system adjacent to the charging device, may increase the charging speed and efficiency of the charging device, and may provide seamless magnetic auto-alignment docking of the portable device with the charging device. Circular or spherical magnets with diametrical magnetic fields may be used to provide both repulsive and attractive forces between the charging device and the portable device that may depend on relative positioning of magnets in the devices. Magnetic poles of the magnets will attract and resist each other based on relative location between the devices. The positioning of these magnets may allow the portable device to automatically locate with a high accuracy with minimal concentration and positioning by a user.

Figure 2:
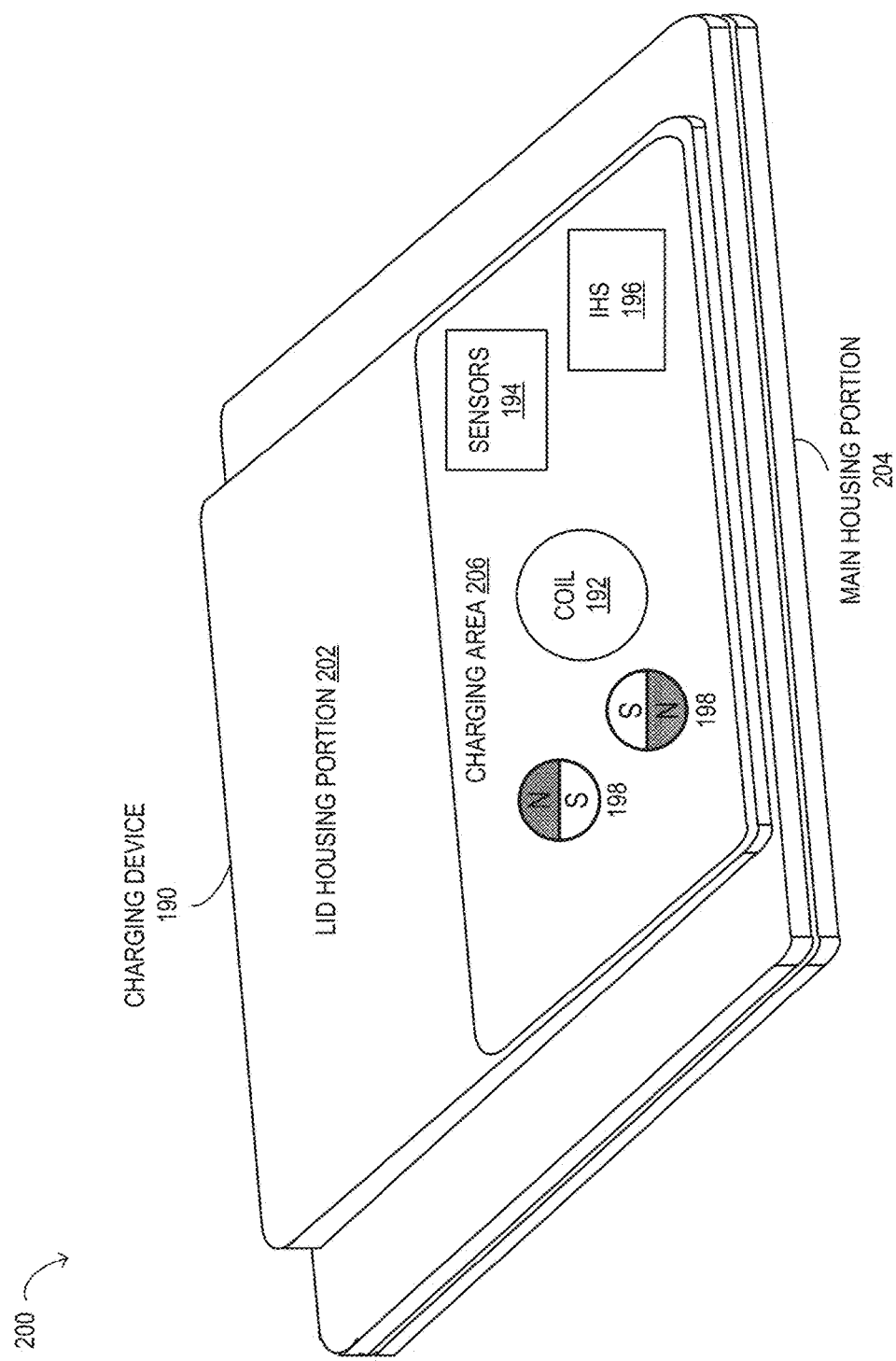
FIG. 2 is a perspective view of selected elements of an embodiment of a charging device.

Turning now to FIG. 2, is a perspective view 200 of a block diagram of selected elements of an embodiment of charging device 190. In FIG. 2, charging device 190 is shown in a schematic representation and is not drawn to scale or perspective. It is noted that, in different embodiments, charging device 190 may be operated with additional or fewer elements.

As shown in FIG. 2, components of charging device 190 may include, but are not limited to, a lid housing portion 202 having a charging area 206 and magnets 198, and a main housing portion 204. Magnets 198 may be disposed at a first charging surface of lid housing portion 202 of charging device 100. Information handling system 196 may incorporate various high efficiency features for use with portable information handling system 100, as disclosed herein. Induction coil 192 may be included in lid housing portion 202, main housing portion 204, or a combination of both. Charging area 206 may be an external surface of lid housing portion 202, which may be a charging mat, a charging pad, a charging plate, and other types of charging surfaces. Induction coil 192 may transmit power wirelessly to portable device 100.

A processor of processor subsystem 120 of information handling system 196 of charging device 190 may detect a portable device, e.g. portable device 100, in proximity of charging device 190 using one or more sensor devices of sensors 194 of charging device 190. Sensors 194 may include a track sensor device, a proximity sensor device, a touch sensor device, an optical sensor device, a thermal sensor device, a specific absorption rate sensor device, an eddy current sensor device, and a wireless communication device, among other types of sensor devices. A wireless communication device may be a Bluetooth device, an infrared device, a near field communication device, a Zigbee device, among other types of wireless communication devices. Sensors 194 may be included in charging area 206, lid housing portion 202, main housing portion 204, or any combination of all three. The processor of charging device 190 may also collect sensor feedback information from the one or more sensor devices of sensors 194, discussed in further detail below.

Turning now to FIG. 3, is a block diagram of selected elements of an embodiment of placement of magnets 198 in charging device 190 and portable device 100. In FIG. 3, charging device 190 and portable device 100 are shown in a schematic representation and are not drawn to scale or perspective. It is noted that, in different embodiments, charging device 190 and portable device 100 may be operated with additional or fewer elements.

As shown in FIG. 3, charging device 190 may also include a first coil charging area 312 and magnets 198-1 through 198-8, each of magnets 198-1 to 198-8 having a first pole and a second pole and disposed at a first charging surface of charging device 190. Induction coil 192 of charging device 190 may define first coil charging area 312 of the first charging surface of lid housing portion 202 of charging device 190. As depicted, magnets 198-1 through 198-4 are disposed at the first charging surface having the first pole oriented in an outward direction from the first charging surface of charging device 190. Magnets 198-5 through 198-8 are disposed at the first charging surface having the second pole oriented in an outward direction from the first charging surface of charging device 190.

Portable device 100 may also include a second coil charging area 314 and magnets 198-9 through 198-12, each of magnets 198-9 to 198-12 having a first pole and a second pole and disposed at a second charging surface of portable device 100. Induction coil 182 of portable device 100 may define second coil charging area 314 of the second charging surface of portable device 100. Magnets 198-5 through 198-8 are disposed at the second charging surface having the second pole oriented in an outward direction from the second charging surface of portable device 100. As shown in FIG. 3, the first poles of magnets 198-1 through 198-4 may be S poles and the second poles of magnets 198-5 through 198-12 may be N poles, where the first poles are opposite polarity of the second poles. In one or more embodiments, the first poles of magnets 198-1 through 198-4 may be N poles and the second poles of magnets 198-5 through 198-12 may be S poles. When portable device 100 may be in proximity of charging device 190, the first poles of magnets 198-1 through 198-4 of charging device 100 may create magnetic attraction forces between the second poles of magnets 198-9 through 198-12 of portable device 100 due to the opposite magnetism of the first poles of magnets 198-1 through 198-4 and the second poles of magnets 198-9 through 198-12. The second poles of magnets 198-5 through 198-8 of charging device 100 may create magnetic repulsion forces between the second poles of magnets 198-9 through 198-12 of portable device 100 due to the same magnetism of the second poles of magnets 198-5 through 198-8 and the second poles of magnets 198-9 through 198-12. During placement of portable device 100 towards charging device 190, the magnetic attraction forces and the magnetic repulsion forces may provide a magnetic steering torque that may guide the placement of portable device 100 to a target location of charging device 190. The target location of charging device 190 may be where induction coil 182 of portable device 100 and induction coil 192 of charging device 190 may be aligned. When the second charging surface of portable device 100 is placed adjacent to the first charging surface of charging device 190, the magnetic attraction forces and the magnetic repulsion forces may cause first coil charging area 312 of charging device 190 and second coil charging area 314 of the second charging surface of portable device 100 to be aligned. When first coil charging area 312 and second coil charging area 312 may be aligned, induction coil 182 of portable device 100 and induction coil 192 of charging device 190 may be aligned, and charging speed and efficiency of charging device 190 may be optimal.

As shown in FIG. 3, magnets 198-1 through 198-4 of charging device 190 are disposed at positions that may be close to or within first coil charging area 312 and magnets 198-9 through 198-12 of portable device 100 are disposed at position that may be close to or within second coil charging area 314 so that the first magnetic attraction forces pull second coil charging area 314 of portable device 100 towards first coil charging area 312 of charging device 190 when portable device 190 is moving towards the center.

Magnets 198-5 through 198-8 of charging device 190 may be disposed at positions that may be farther away from first coil charging area 312 than magnets 198-1 through 198-4 so that the first magnetic repulsion forces push second coil charging area 314 of portable device 100 towards first coil charging area 312 of charging device 190 when portable device 190 is moving away from the center.

In one or more embodiments, charging device 190 may have one or more magnets 198 each having its first pole oriented in the outward direction from the first charging surface of charging device 190 and one or more magnets 198 each having its second pole oriented in the outward direction from the first charging surface. Portable device 100 may have one or more magnets 198 each having its second pole oriented in the outward direction from the second charging surface of portable device 100. The one or more magnets 198 each having its first pole oriented in the outward direction and the one or more magnets 198 each having its second pole oriented in the outward direction may be disposed at different positions of the first charging surface of charging device 190, and the one or more magnets 198 each having its second pole oriented in the outward direction may be disposed at different positions of the second charging surface of portable device 100 such that the magnetic attraction forces and the magnetic repulsion forces cause the first coil charging area of charging device 190 and the second coil charging area of the second charging surface of the portable device 100 to be aligned.

In an exemplary embodiment, magnets 198-1 through 198-8 of charging device 190 may include a first magnet 198-1 that may have a first pole and a second pole, and a second magnet 198-5 that may have a first pole and a second pole. When portable device 100 may be in proximity of charging device 190, the first pole of the first magnet 198-1 may create a first magnetic attraction force between a second pole of a third magnet 198-9 that may be disposed at the second charging surface of portable device 100 due to the opposite magnetism of the first pole of the first magnet 198-1 and the second pole of the third magnet 198-9. The second pole of the second magnet 198-5 may create a first magnetic repulsion force between the second pole of the third magnet 198-9 of portable device 100 due to same magnetism of the second pole of the second magnet 198-5 and the second pole of the third magnet 198. When the second charging surface of portable device 100 is placed adjacent to the first charging surface of charging device 190, the first magnetic attraction force and the first magnetic repulsion force may cause the first coil charging area 312 of charging device 190 and the second coil charging area 314 of the second charging surface of the portable device 100 to be aligned.

In one or more other embodiments, charging device 190 may also include a fourth magnet 198-2 that may have a first pole and a second pole and may be disposed at the first charging surface of charging device 190, and a fifth magnet 198-6 that may have a first pole and a second pole and may be disposed at the first charging surface of charging device 190. When portable device 100 may be in proximity of charging device 190, the first pole of the fourth magnet 198-2 may create a second magnetic attraction force between the second pole of the third magnet 198-9, and the second pole of the fifth magnet 198-6 may create a second magnetic repulsion force between the second pole of the third magnet 198-9. When the second charging surface of portable device 100 is placed adjacent to the first charging surface of charging device 190, the second magnetic attraction force and the second magnetic repulsion force may provide additional magnetic forces that may cause the first coil charging area 312 and the second coil charging area 314 to be aligned.

In one or more other embodiments, charging device 190 may also include a fourth magnet 198-2 that may have a first pole and a second pole and may be disposed at the first charging surface of charging device 190, and a fifth magnet 198-6 that may have a first pole and a second pole and may be disposed at the first charging surface of charging device 190. When portable device 100 may be in proximity of charging device 190, the first pole of the fourth magnet 198-2 may create a second magnetic attraction force between a second pole of a sixth magnet 198-10 that may be disposed at the second charging surface of portable device 100, and the second pole of the fifth magnet 198-6 may create a second magnetic repulsion force between the second pole of the sixth magnet 198-10. When the second charging surface of portable device 100 is placed adjacent to the first charging surface of charging device 190, the second magnetic attraction force and the second magnetic repulsion force may provide additional magnetic forces that may cause the first coil charging area 312 and the second coil charging area 314 to be aligned.

In one or more embodiments, when portable device 100 may be in proximity of charging device 190, the second pole of the second magnet 198-5 may create a second magnetic attraction force between a first pole of a fourth magnet 198-10 that may be disposed at the second charging surface of portable device 100. When the second charging surface of portable device 100 is placed adjacent to the first charging surface of charging device 190, the second magnetic attraction force may provide an additional magnetic force that may cause the first coil charging area 312 and the second coil charging area 314 to be aligned. The size of the third magnet 198-9 and the fourth magnet 198-10 may be less than the size of the first magnet 198-1 and the second magnet 198-5.

Figure 4:
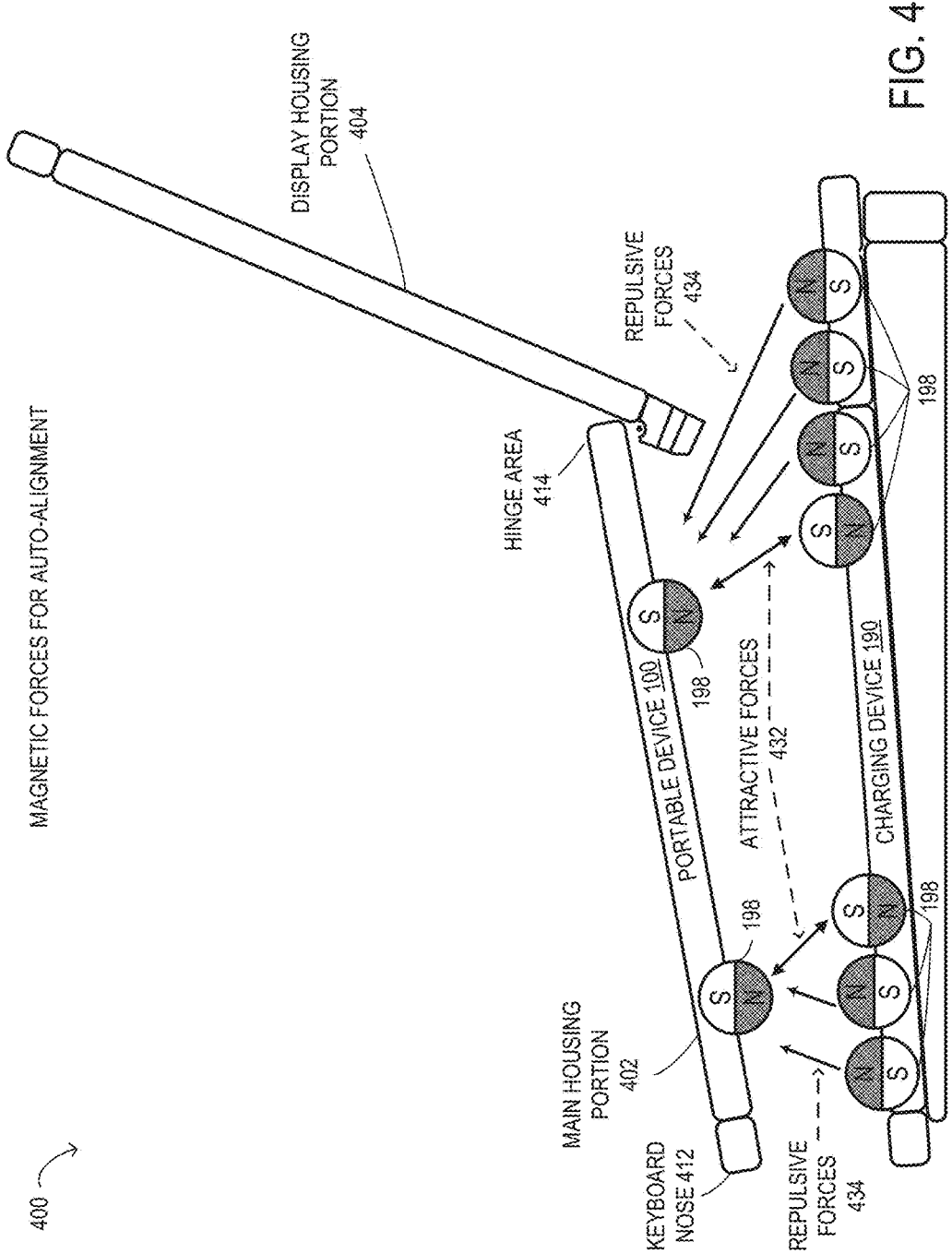
FIG. 4 is a side view of embodiments a charging device and a portable device illustrating magnetic forces for auto-alignment.

Turning now to FIG. 4, is a side view of embodiments charging device 190 and portable device 100 illustrating magnetic forces for auto-alignment. In FIG. 4, charging device 190 and portable device 100 are shown in a schematic representation and are not drawn to scale or perspective. It is noted that, in different embodiments, charging device 190 and portable device 100 may be operated with additional or fewer elements.

As shown in FIG. 4, portable device 100 may include a main housing portion 402, a display housing portion 404, a keyboard nose 412 at a front portion of main housing portion 402 of portable device 100, and a hinge area 414 at a rear portion of main housing portion 402 of portable device 100. Magnetic attraction forces 432 (attractive forces 432) are shown between magnets 198 of charging device 190 having first poles (S poles) oriented in an outward and upward direction towards portable device 190 and magnets 198 of portable device 100 having second poles (N poles) oriented in an outward and downward direction. Magnetic repulsion forces 434 (repulsive forces 434) are shown between magnets 198 of charging device 190 having second poles (N poles) oriented in an outward and upward direction towards portable device 190 and magnets 198 of portable device 100 having second poles (N poles) oriented in an outward and downward direction. As shown, each magnet 198 having an S pole orientation of charging device 190 has a respective magnet 198 having an N pole orientation of portable device 100. Each magnet 198 having an N pole orientation of portable device 100 has more than one respective magnet 198 having an N pole orientation of charging device 190. As such, magnetic repulsion forces 434 between magnets 198 of charging device 190 and portable device 100 may be greater than magnetic attraction forces 432, which may offer any number of combinations of magnet positions, number of magnets, size of magnets, and orientations of magnets that may be utilized for magnetic self-aligning coil centering for wireless charging.

Figure 5:
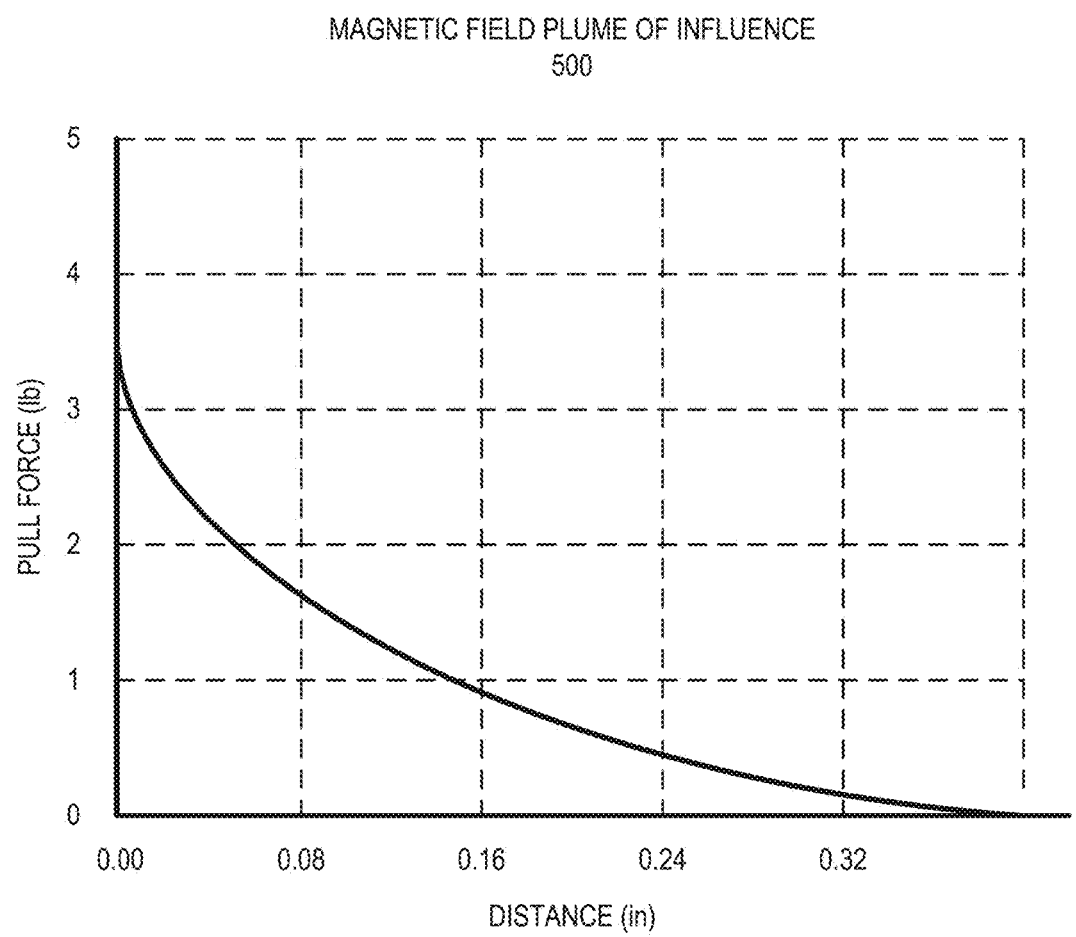
FIG. 5 is a chart of magnetic field plume of influence of a magnet of a charging device.

FIG. 5 shows a chart 500 of magnetic field plume of influence of a magnet of a charging device. Magnetic field strength may be exponentially proportional to the distance between magnets. Chart 500 shows magnet to magnet interaction forces for magnets of approximately 200 sq. mm in volume. In a charging device having four steering magnets, chart 500 shows that influential steering forces of approximately one pound (lb.) will be noticed in gap distances of roughly 6 mm. A user may feel a quarter pound of magnetic influence steering at gaps up to 10 mm. At 2 mm gap distances, a 3 lb. portable device may be levitated above a charging surface of a charging device through magnetic forces. These magnetic field strengths may be tuned to provide a desired docking experience for the user when docking a portable device to a charging device.

Figure 6A:
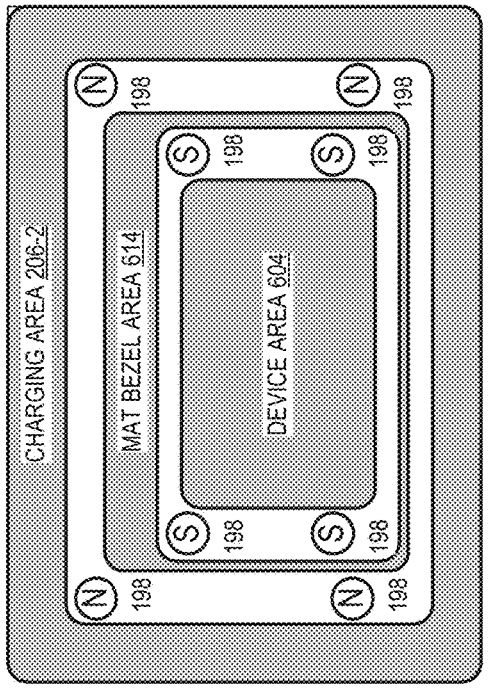
FIGS. 6A, 6B, and 6C are block diagrams of selected elements of embodiments of charging mat areas of a charging device.
Figure 6B:
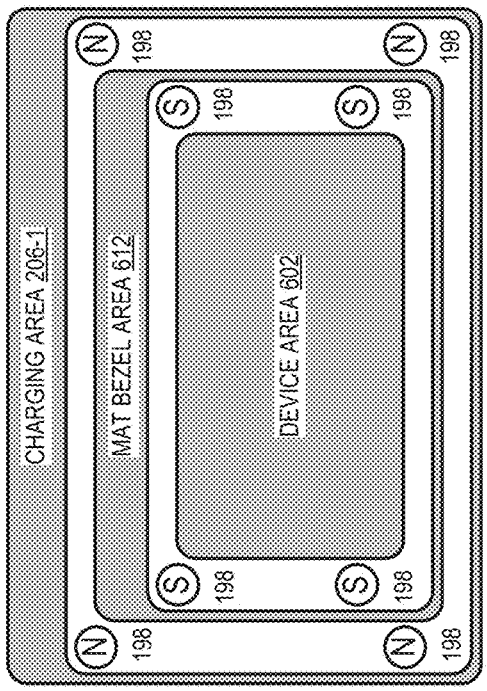
Figure 6C:
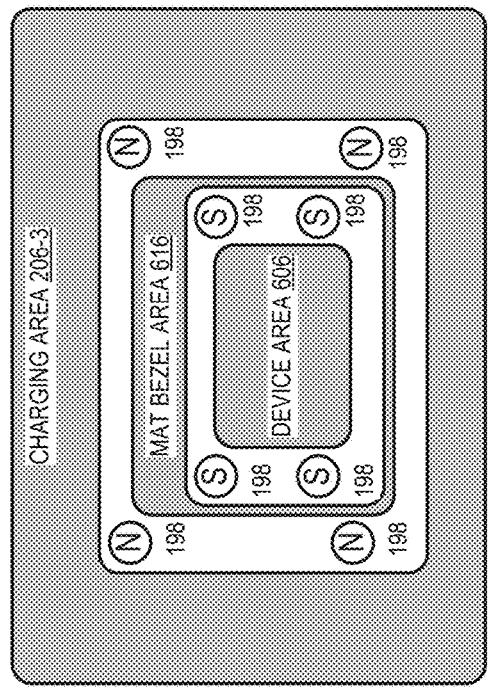

Turning now to FIGS. 6A, 6B, and 6C, are block diagrams 600 of selected elements of embodiments of charging areas 206-1, 206-2, and 206-3 of charging device 190. In FIGS. 6A, 6B, and 6C, charging areas 206-1, 206-2, and 206-3 of charging device 190 are shown in a schematic representation and are not drawn to scale or perspective. It is noted that, in different embodiments, charging areas 206-1, 206-2, and 206-3 may be operated with additional or fewer elements.

As shown in FIG. 6A, charging area 206-1 may include a device area 602, a mat bezel area 612, and magnets 198. Device area 602 may be based on a size of portable device 100. Mat bezel area 612 may include a surface bezel that may have geometric contours that may provide different alignment adjustment based on a size of portable device 100. The surface bezel may be a plastic bezel and may be interchangeable with one or more other surface bezels that may have different geometric contours than the surface bezel. This may enable swapping out different surface bezels for a single mat bezel area 612 based on different sizes and geometries of portable devices. Similarly, as shown in FIG. 6B, charging area 206-2 may include a device area 604, a mat bezel area 614, and magnets 198. Device area 604 may be a smaller area than device area 602 and may provide better alignment adjustment for smaller portable devices 100. FIG. 6C, also shows charging area 206-3 that may be similar to charging areas 206-1 and 206-2. Charging area 206-3 may include a device area 606, a mat bezel area 616, and magnets 198. Device area 606 may be a smaller area than device areas 602 and 604 and may provide better alignment adjustment for even smaller portable devices 100.

Figure 7:
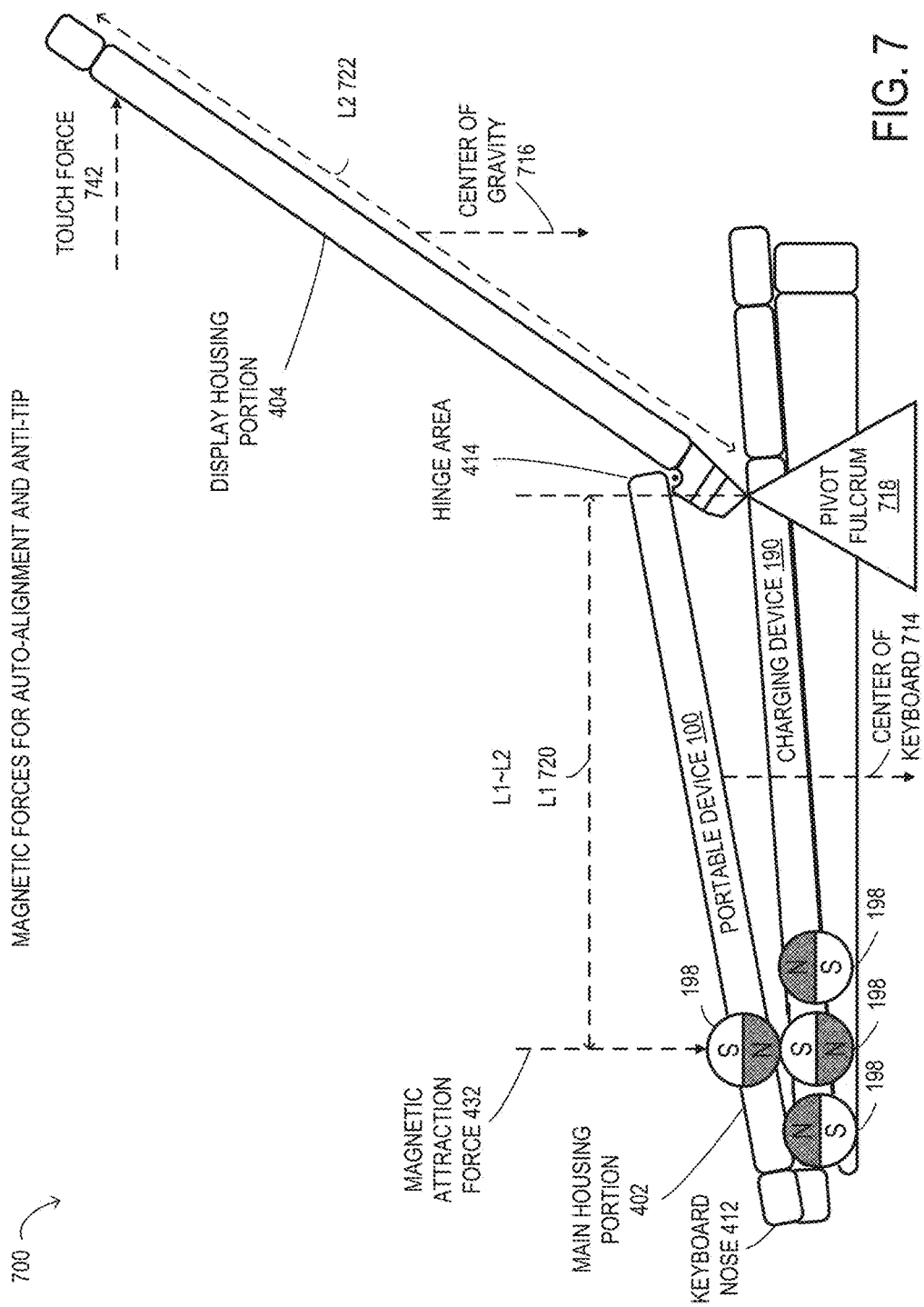
FIG. 7 is a side view of an embodiment of a charging device and a portable device illustrating magnetic forces for auto-alignment and anti-tip.

Turning now to FIG. 7, is a side view of an embodiment of charging device 190 and portable device 100 illustrating magnetic forces 700 for auto-alignment and anti-tip. In FIG. 7, charging device 190 and portable device 100 are shown in a schematic representation and are not drawn to scale or perspective. It is noted that, in different embodiments, charging device 190 and portable device 100 may be operated with additional or fewer elements.

As shown in FIG. 7, charging device 190 includes a first magnet 198 having a first pole (S pole) oriented upward and second and third magnets 198, having second poles (N poles) oriented upward on either side of the first magnet 198. The first, second, and third magnets 198 are disposed in a front portion of charging device 100. Portable device 100 includes a fourth magnet 198 having a second pole (N pole) oriented downward and disposed in a respective front position of portable device 100 near keyboard nose 412. Magnetic attraction force 432 is shown between the first magnet 198 of charging device 190 and the fourth magnet 198 of portable device 100. A pivot fulcrum 718 of portable device 100 is shown where hinge area 414 of portable device 100 contacts charging device 190. A center of a keyboard 714 of main housing portion 402, a center of gravity 716 of display housing portion 404, a lever arm L1 720 extending from magnet 198 of portable device 100 to hinge area 414, and a lever arm L2 722 extending from hinge area 414 of portable device to a top display portion of display housing portion 404, are also shown. The length of lever arm L1 720 may be approximately equal to the length of lever arm L2 722 with respect to pivot fulcrum 718. By locating magnets 198 at the front portions of charging device 190 and portable device 100, magnetic attraction force 432 may provide an anti-tip magnetic attraction force when portable device 100 is adjacent to the first charging surface of charging device 190 and display housing portion 404 may be in an open position. The anti-tip magnetic attraction force may allow a higher touch force 742 to be applied to a display portion of the display housing portion 404 when in an open position without causing the portable device to tip over.

For example, two mating pairs of small neodymium magnets 198 may generate upwards of 3 lbs. of clamping load which may exceeds the 95% percentile of typical touch force of a user applied on portable device 100. The size of magnets 198 may be based on an amount of touch force to be supported, an amount of magnetic attraction force to prevent a charging mat on a first charging surface of charging device 190 from being lifted when portable device 100 is un-docked from charging device 100, and an amount of magnetic attraction force to prevent difficulty in un-docking portable device 100 from charging device 100. By using anti-tip magnetic attraction forces to prevent portable device 100 from tipping, the need for additional weight in the front portion of main housing portion 402 of portable device 100 may be minimized, and display housing portion 404 may be opened to larger angles without tipping.

Figure 8:
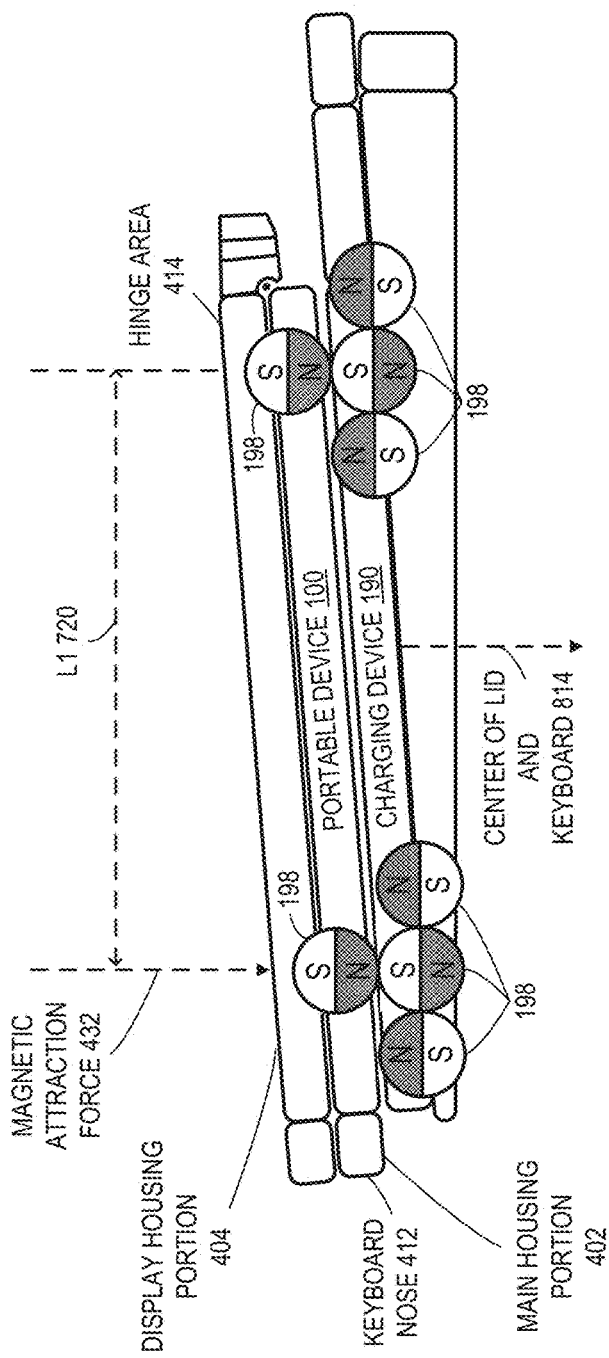
FIG. 8 is a side view of embodiments a charging device and a portable device in a lid closed position illustrating magnetic forces for auto-alignment.

Turning now to FIG. 8, is a side view of an embodiment of charging device 190 and portable device 100 in a lid closed position illustrating magnetic forces for auto-alignment. In FIG. 8, charging device 190 and portable device 100 are shown in a schematic representation and are not drawn to scale or perspective. It is noted that, in different embodiments, charging device 190 and portable device 100 may be operated with additional or fewer elements.

As shown in FIG. 8, magnets 198 are located in both the front portion and the rear portion of charging device 190 and both the respective front portion keyboard nose 412 and the respective rear portion hinge area 414 of portable device 100. Lever arm L1 720 extends from the magnet 198 in the front portion and the magnet 198 in the rear portion of portable device 100. The center of gravity of lid housing portion 202, keyboard main housing portion 402, and display housing portion 404 is shown by the dotted line arrow 814.

In one or more embodiments of charging device 190, the first and the second magnets 198 may be located at a front portion of the first charging surface of charging device 190, the fourth and fifth magnets 198 may be located at a back portion of the first charging surface of charging device 190, the third magnet 198 may be located at a respective front portion of the second charging surface of portable device 100, and the sixth magnet 198 may be located at a respective back portion of the second charging surface of portable device 100 so that the first and second magnetic attraction forces and the first and second magnetic repulsion forces may provide an increased magnetic steering torque that may cause the first coil charging area 312 and the second coil charging area 314 to be aligned. In this configuration, magnets 198 in all four corners of portable device 100 and charging device 190, which may be a preferred configuration for portable device 100 in a lid closed position and any open position. This configuration may provide maximum lever arm distances with many potential user hand contact grip locations of portable device 100 during various docking scenarios. Magnetic forces may be applied further from user grip points and may provide greater steering torque for auto-alignment and coil centering.

Figure 9:
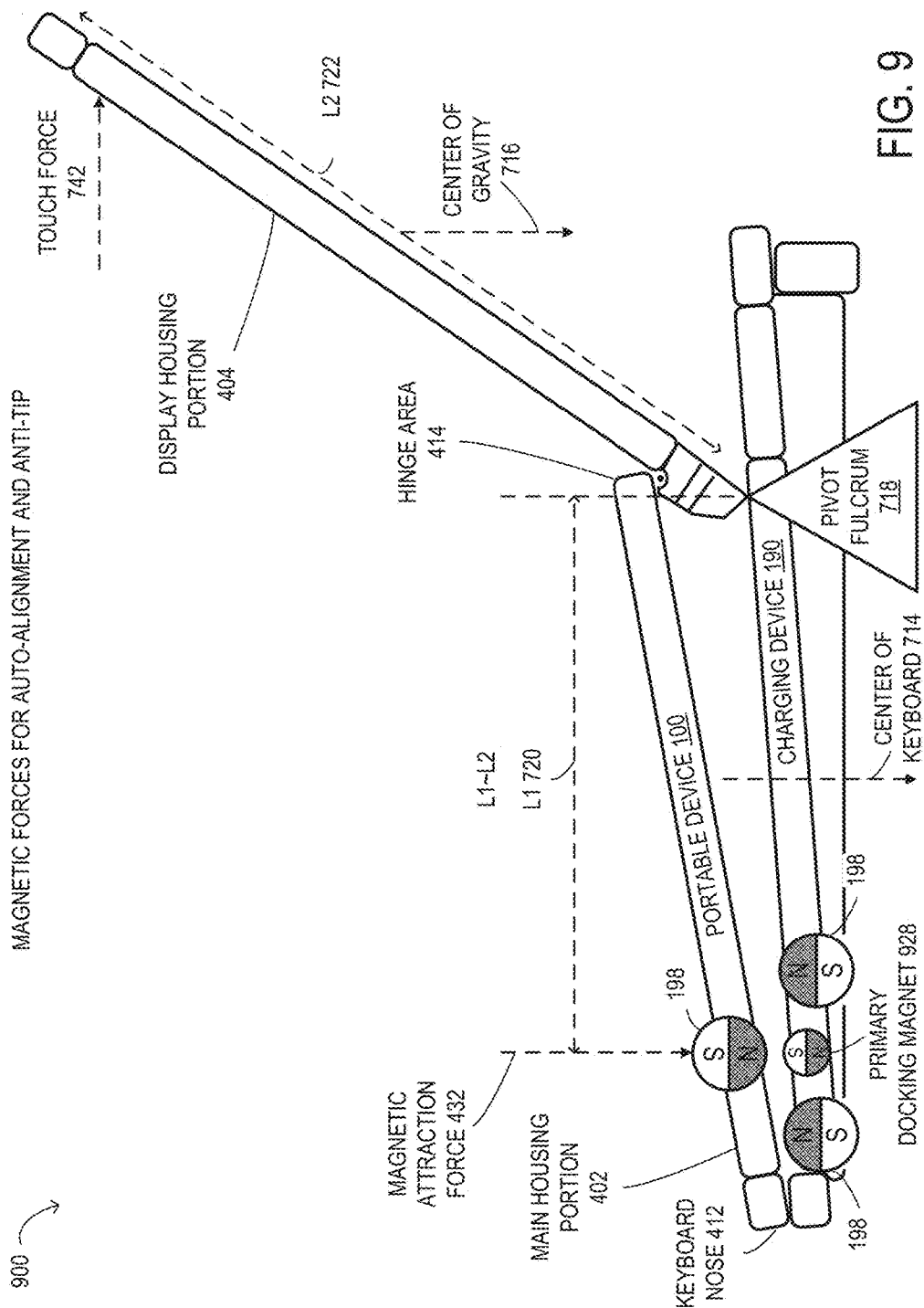
FIG. 9 is a side view of embodiments a charging device and a portable device illustrating magnetic forces for auto-alignment and anti-tip.

Turning now to FIG. 9, is a side view of an embodiment of charging device 190 and portable device 100 illustrating magnetic forces 900 for auto-alignment and anti-tip. In FIG. 9, charging device 190 and portable device 100 are shown in a schematic representation and are not drawn to scale or perspective. It is noted that, in different embodiments, charging device 190 and portable device 100 may be operated with additional or fewer elements.

FIG. 9 shows a similar embodiment of charging device 190 and portable device 100 as shown in FIG. 7. Charging device 190 includes a primary docking magnet 928 as the first magnet 198 having a first pole (S) oriented upward. The other magnets 198 of charging device 190 and portable device 100 are positioned and oriented the same as in FIG. 7. The size of primary docking magnet 928 of charging device 190 may be less than the size of the third magnet 198 of portable device 100 so that the first magnetic attraction force between the first pole of primary docking magnet 928 and the second pole of the third magnet 198 may be less than the first magnetic repulsion force. By using a smaller size primary docking magnet 28, undocking portable device 100 from charging device 190 may be easier, while still providing strong influence magnets 198 around the targeted docking position.

Figure 10:
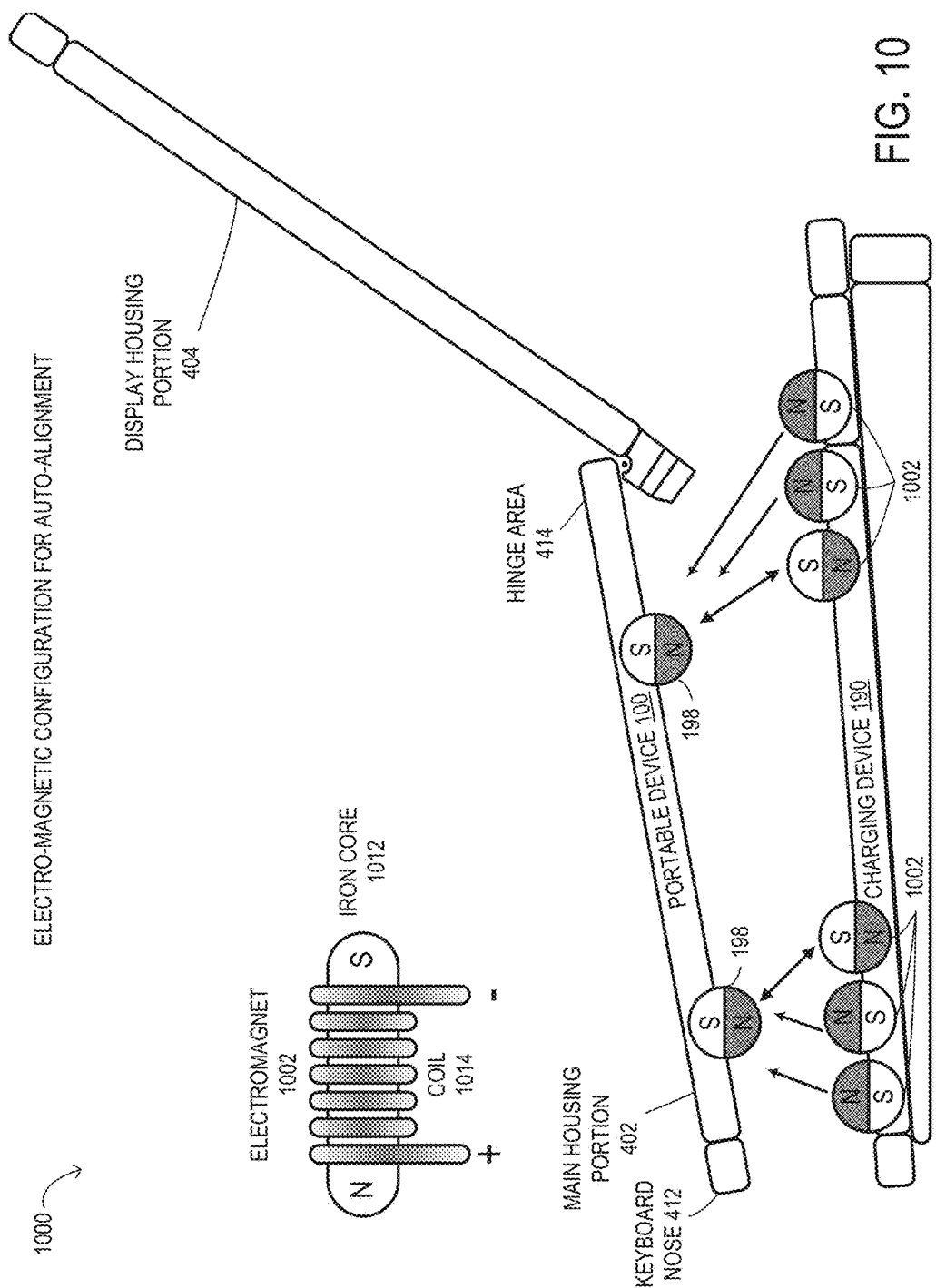
FIG. 10 is a block diagram of an electromagnet and a side view of embodiments a charging device and a portable device illustrating magnetic forces for auto-alignment.

Turning now to FIG. 10, is a block diagram of an electromagnet 1002 and a side view of an embodiment of charging device 190 and portable device 100 illustrating magnetic forces for auto-alignment. In FIG. 10, charging device 190 and portable device 100 are shown in a schematic representation and are not drawn to scale or perspective. It is noted that, in different embodiments, charging device 190 and portable device 100 may be operated with additional or fewer elements.

As shown in FIG. 10, electromagnet 1002 may include an iron core 1012 and a coil 1014. The strength of the magnetic attraction force and the magnetic repulsion force of electromagnet 1002 may vary based on the amount of current flowing through coil 1014. Charging device 190 may receive an alternating current (A/C) from an A/C power source and may include a rectifier to convert the A/C power to a direct current (DC). A processor of charging device 190 may control the current levels to individual coils of respective electromagnets 1002 to vary magnetic field strengths, and activate and deactivate electromagnets 1002. Electromagnets 1002 may be controlled through communications between charging device 190 and portable device 100. A processor of charging device 190 may also receive sensor feedback from sensors 184 of portable device 100 and sensors 194 of charging device 190 and activate, deactivate, and adjust magnetic forces at the coil locations of electromagnets 1002. For example, sensors 184 of portable device 100 may also include human presence sensors and accelerometers that may be used to control electromagnets 1002 of charging device 190 and portable device 100.

Figure 11:
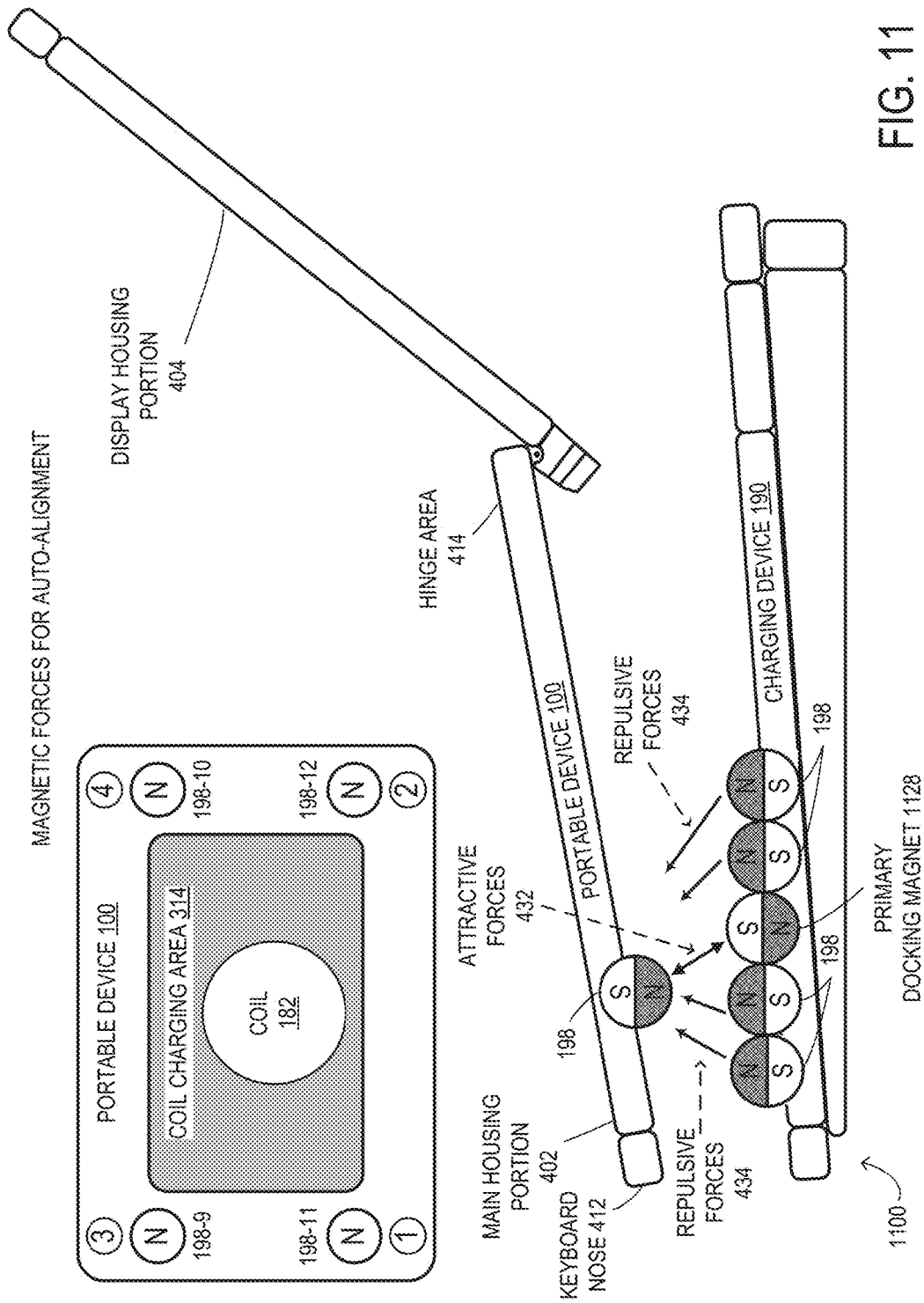
FIG. 11 is a side view of embodiments a charging device and a portable device illustrating magnetic forces for auto-alignment.

Turning now to FIG. 11, is a side view of an embodiment of charging device 190 and portable device 100 illustrating magnetic forces for auto-alignment. In FIG. 11, charging device 190 and portable device 100 are shown in a schematic representation and are not drawn to scale or perspective. It is noted that, in different embodiments, charging device 190 and portable device 100 may be operated with additional or fewer elements.

FIG. 11, shows a configuration of magnets that may allow two or four docking alignment sites. For example, if two docking sites at the front portion keyboard nose 412 were implemented, magnet 198 locations 1 and 2, then primary docking magnet 1128 may be placed in the center of repulsive magnets 198 of charging device 190 that may provide auto-alignment in all X and Y directions. Alternatively, this same approach may be used for magnet locations 3 and 4. Generating X-Y alignment may only require discrete magnetic docking sites. Having four docking sites may provide a more advantageous system, which may allow more variation in how portable device 100 may be placed on the first charging surface of charging device 190. It may also help in lid open and lid closed positions of portable device 100 in detectable systems where a hinge angle may articulate the portable device 100 tilt angle.

Figure 12:
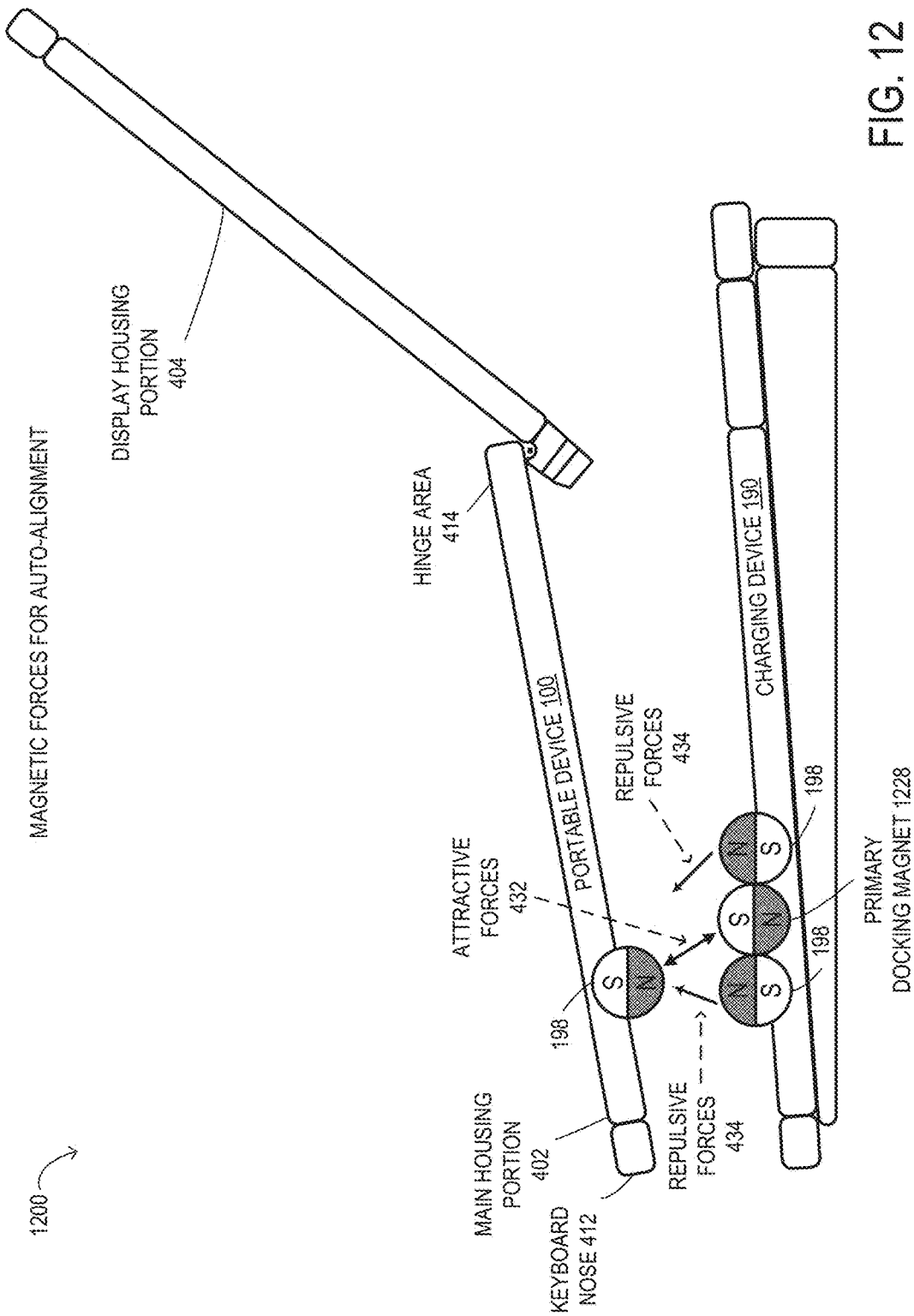
FIG. 12 is a side view of embodiments a charging device and a portable device illustrating magnetic forces for auto-alignment.

Turning now to FIG. 12, is a side view of an embodiment of charging device 190 and portable device 100 illustrating magnetic forces for auto-alignment. In FIG. 12, charging device 190 and portable device 100 are shown in a schematic representation and are not drawn to scale or perspective. It is noted that, in different embodiments, charging device 190 and portable device 100 may be operated with additional or fewer elements.

As shown in FIG. 12, charging device 190 includes a primary docking magnet 1228 as the first magnet 198. The number of repulsive magnets 198 having a second pole (N) oriented upward of charging device 190 may be increased or reduced to provide more or less area of influence as desired.

Figure 13:
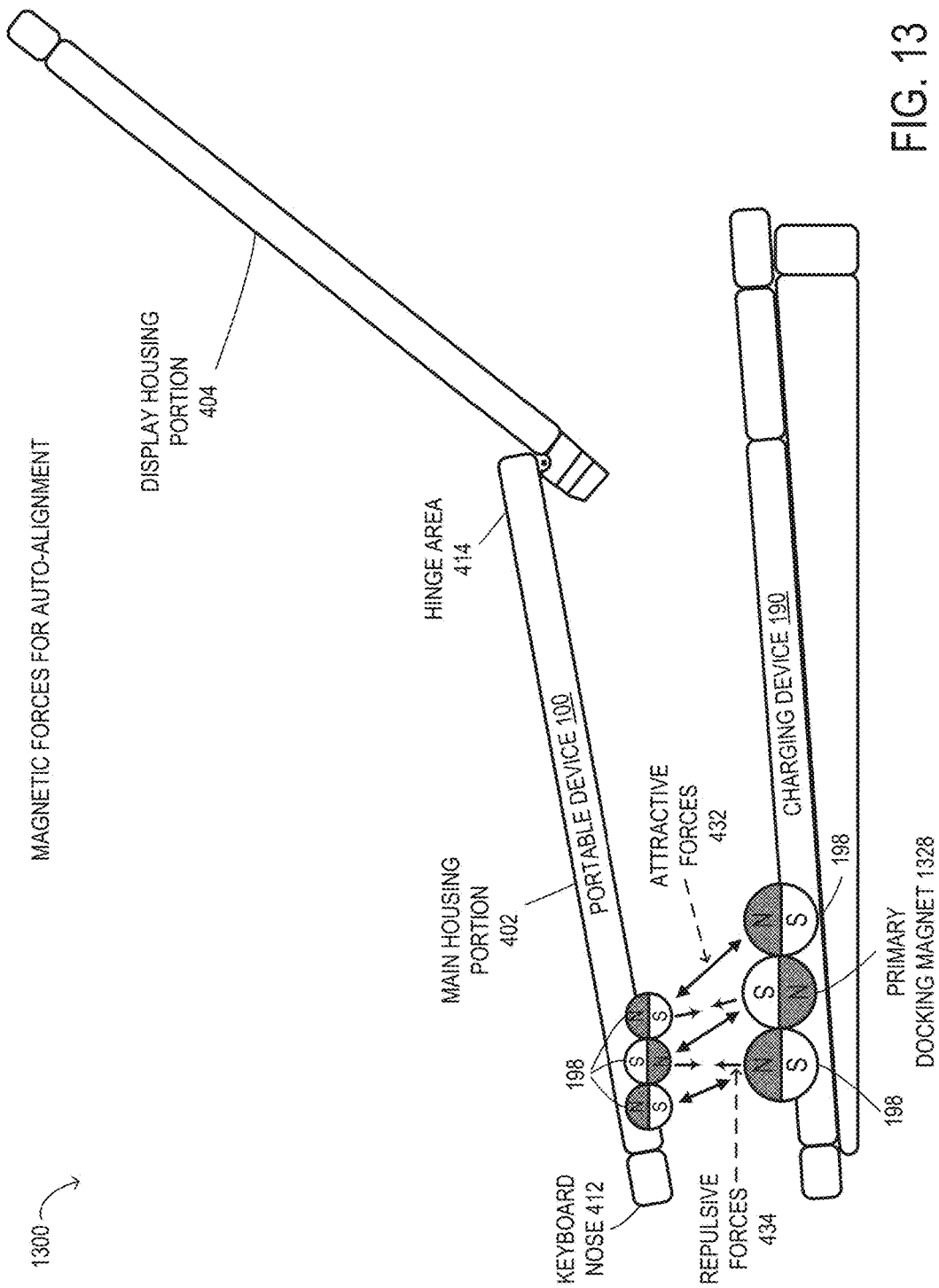
FIG. 13 is a side view of embodiments a charging device and a portable device illustrating magnetic forces for auto-alignment.

Turning now to FIG. 13, is a side view of an embodiment of charging device 190 and portable device 100 illustrating magnetic forces for auto-alignment. In FIG. 13, charging device 190 and portable device 100 are shown in a schematic representation and are not drawn to scale or perspective. It is noted that, in different embodiments, charging device 190 and portable device 100 may be operated with additional or fewer elements.

As shown in FIG. 13, charging device 190 may include a primary docking magnet 1328 as the first magnet 198. A magnet configuration of magnets 198 may also use a series of smaller magnets 198 of portable device 100 that may reduce an overall design thickness of portable device 100, while still providing larger magnetic force strengths.

Figure 14:
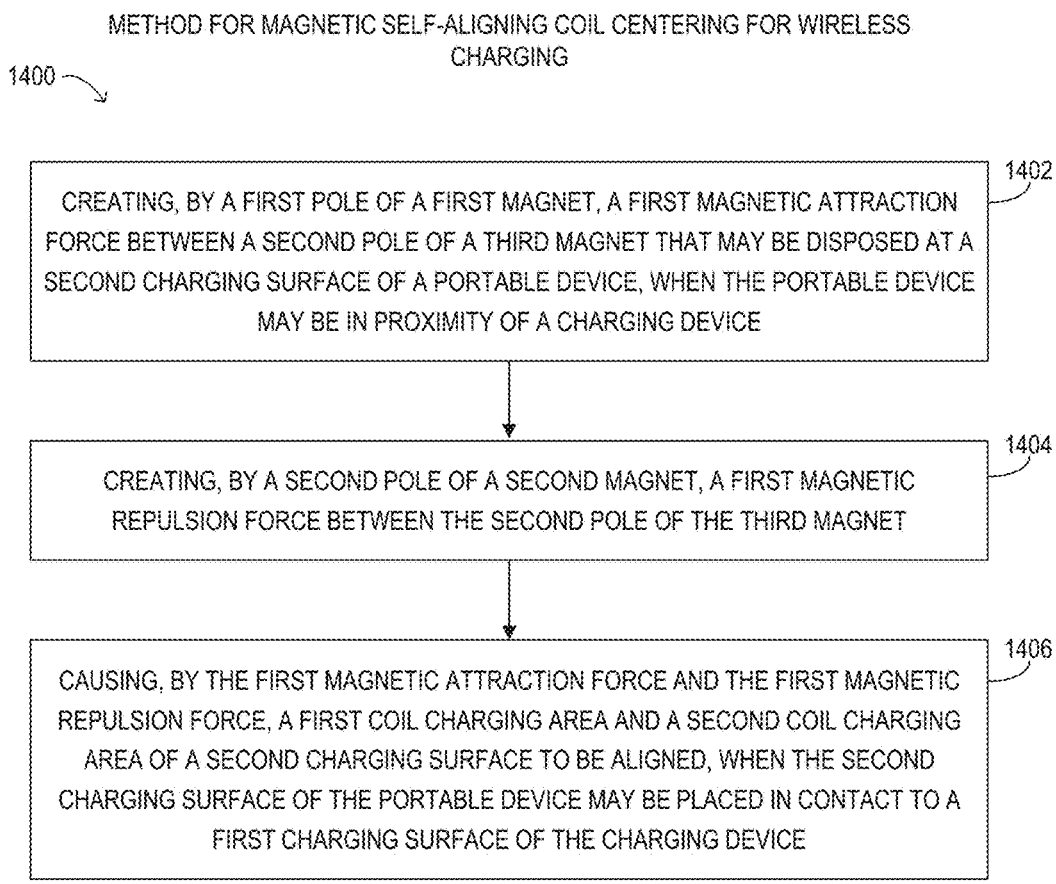
FIG. 14 is a flow chart of selected elements of a method for magnetic self-aligning coil centering for wireless charging.

Referring now to FIG. 14, a flow chart of selected elements of a method 1400 for magnetic self-aligning coil centering for wireless charging, as described herein, is depicted in flowchart form. Method 1400 may be performed using charging device 190 (see FIGS. 1, 2, 3, 4, 6A, 6B, 6C, 7, 8, 9, 10, 11, 12, 13, and 14) and, in particular, by charging device 190 and magnets 198. It is noted that certain operations described in method 1400 may be optional or may be rearranged in different embodiments.

Method 1400 may begin at step 1402, in a charging device that may include a first induction coil that may transmit power wirelessly to a portable device that may include a second induction coil, a first charging surface that may have a first coil charging area that may be defined by the first induction coil, a first magnet that may have a first pole and a second pole and may be disposed at the first charging surface, and a second magnet that may have a first pole and a second pole and may be disposed at the first charging surface, by creating, by the first pole of the first magnet, a first magnetic attraction force between a second pole of a third magnet that may be disposed at a second charging surface of the portable device, when the portable device may be in proximity of the charging device. At step 1404, creating, by the second pole of the second magnet, a first magnetic repulsion force between the second pole of the third magnet. At step 1406, causing, by the first magnetic attraction force and the first magnetic repulsion force, the first coil charging area and a second coil charging area of the second charging surface to be aligned, when the second charging surface of the portable device is placed adjacent to the first charging surface of the charging device. The second coil charging area may be defined by the second induction coil.

As disclosed herein, systems and methods for magnetic self-aligning coil centering for wireless charging may include a charging device that may transmit power wirelessly to a portable device. The charging device may include a first magnet and a second magnet. When the portable device may be in proximity of the charging device, a first pole of the first magnet may create a first magnetic attraction force between a second pole of a third magnet of the portable device, and the second pole of the second magnet may create a first magnetic repulsion force between the second pole of the third magnet. When the portable device is placed adjacent to the charging device, the first magnetic attraction force and the first magnetic repulsion force may cause a first coil charging area of the charging device and a second coil charging area of the portable device to be aligned.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A charging device, comprising:
    a first induction coil configured to transmit power wirelessly to a portable device having a second induction coil;
    a first charging surface including a first coil charging area defined by the first induction coil;
    a first magnet having a first pole and a second pole and disposed at the first charging surface; and
    a second magnet having a first pole and a second pole and disposed at the first charging surface, wherein
    when the portable device is in proximity of the charging device, the first pole of the first magnet creates a first magnetic attraction force with a third magnet disposed at a second charging surface of the portable device, and the second pole of the second magnet creates a first magnetic repulsion force with the third magnet, wherein
    when the second charging surface of the portable device is placed adjacent to the first charging surface of the charging device, the first magnetic attraction force and the first magnetic repulsion force cause the first coil charging area and a second coil charging area of the second charging surface to be aligned, and wherein the second coil charging area defined by the second induction coil,
    wherein the first magnetic attraction force provides an anti-tip magnetic attraction force when the portable device is adjacent to the first charging surface and a touch force is applied to a display portion of the portable device when the display portion is in an open position.

2. The charging device of claim 1, the charging device further comprising:
    a fourth magnet having a first pole and a second pole and disposed at the first charging surface; and
    a fifth magnet having a first pole and a second pole and disposed at the first charging surface, wherein
    when the portable device is in proximity of the charging device, the first pole of the fourth magnet creates a second magnetic attraction force with the third magnet, and the second pole of the fifth magnet creates a second magnetic repulsion force with the third magnet, wherein
    when the second charging surface of the portable device is placed adjacent to the first charging surface of the charging device, the second magnetic attraction force and the second magnetic repulsion force provide additional magnetic forces to cause the first coil charging area and the second coil charging area to be aligned.

3. The charging device of claim 1, the charging device further comprising:
    a fourth magnet having a first pole and a second pole and disposed at the first charging surface; and
    a fifth magnet having a first pole and a second pole and disposed at the first charging surface, wherein
    when the portable device is in proximity of the charging device, the first pole of the fourth magnet creates a second magnetic attraction force with a sixth magnet disposed at the second charging surface of the portable device, and the second pole of the fifth magnet creates a second magnetic repulsion force with the sixth magnet, wherein
    when the second charging surface of the portable device is placed adjacent to the first charging surface of the charging device, the second magnetic attraction force and the second magnetic repulsion force provide additional magnetic forces to cause the first coil charging area and the second coil charging area to be aligned.

4. The charging device of claim 1, wherein when the portable device is in proximity of the charging device, the second pole of the second magnet creates a second magnetic attraction force with a fourth magnet disposed at the second charging surface of the portable device, wherein
    when the second charging surface of the portable device is placed adjacent to the first charging surface of the charging device, the second magnetic attraction force provides an additional magnetic force to cause the first coil charging area and the second coil charging area to be aligned, and wherein
    the size of the third and fourth magnets are less than the size of the first and the second magnets.

5. The charging device of claim 1, wherein the first and the second magnets are located at a front portion of the first charging surface of the charging device and the third magnet is located at a respective front portion of the second charging surface of the portable device so that the first magnetic attraction force provides the anti-tip magnetic attraction force.

6. The charging device of claim 3, wherein the first and the second magnets are located at a front portion of the first charging surface of the charging device, the fourth and fifth magnets are located at a back portion of the first charging surface of the charging device, the third magnet is located at a respective front portion of the second charging surface of the portable device, and the sixth magnet is located at a respective back portion of the second charging surface of the portable device so that the first and second magnetic attraction forces and the first and second magnetic repulsion forces provide an increased magnetic steering torque to cause the first coil charging area and the second coil charging area to be aligned.

7. The charging device of claim 1, wherein the first, the second, and the third magnets are spherical magnets having diametrical magnetic fields, wherein the first, the second, and the third magnets are neodymium magnets, and wherein the first poles of the first and the second magnets have the opposite polarity as the second poles of the first and the second magnets.

8. The charging device of claim 1, wherein one or more of the first and the second magnets are electromagnets.

9. The charging device of claim 1, wherein the size of the first magnet is less than the size of the second magnet so that the first magnetic attraction force is less than the first magnetic repulsion force.

10. The charging device of claim 1, the first charging surface of the charging device further comprising:
a surface bezel including geometric contours to provide additional alignment adjustment based on a size of the portable device, wherein the surface bezel is a plastic bezel.

11. A portable device, comprising:
a second induction coil configured to receive power wirelessly from a charging device having a first induction coil;
a second charging surface including a second coil charging area defined by the second induction coil; and
a third magnet disposed at the second charging surface, wherein
when the portable device is in proximity of the charging device, the third magnet creates a first magnetic attraction force with a first pole of a first magnet having the first pole and a second pole disposed at a first charging surface of the charging device, and the third magnet creates a first magnetic repulsion force with a second pole of a second magnet having a first pole and the second pole disposed at the first charging surface of the charging device, wherein
when the second charging surface of the portable device is placed adjacent to the first charging surface of the charging device, the first magnetic attraction force and the first magnetic repulsion force cause a first coil charging area of the first charging surface and the second coil charging area to be aligned, and wherein the first coil charging area defined by the first induction coil,
wherein the first magnetic attraction force provides an anti-tip magnetic attraction force when the portable device is adjacent to the first charging surface and a touch force is applied to a display portion of the portable device when the display portion is in an open position.

12. The portable device of claim 11, wherein
when the portable device is in proximity of the charging device, the third magnet creates a second magnetic attraction force with a first pole of a fourth magnet having the first pole and a second pole disposed at the first charging surface, and the third magnet creates a second magnetic repulsion force with a second pole of a fifth magnet having a first pole and the second pole disposed at the first charging surface, wherein
when the second charging surface of the portable device is placed adjacent to the first charging surface of the charging device, the second magnetic attraction force and the second magnetic repulsion force provide additional magnetic forces to cause the first coil charging area and the second coil charging area to be aligned.

13. The portable device of claim 11, the portable device further comprising:
a sixth magnet disposed at the second charging surface of the portable device, wherein
when the portable device is in proximity of the charging device, the sixth magnet creates a second magnetic attraction force with a first pole of a fourth magnet having the first pole and a second pole disposed at the first charging surface, and the sixth magnet creates a second magnetic repulsion force with a second pole of a fifth magnet having a first pole and the second pole disposed at the first charging surface, wherein
when the second charging surface of the portable device is placed adjacent to the first charging surface of the charging device, the second magnetic attraction force and the second magnetic repulsion force provide additional magnetic forces to cause the first coil charging area and the second coil charging area to be aligned.

14. The portable device of claim 11, the portable device further comprising:
a fourth magnet disposed at the second charging surface of the portable device, wherein
when the portable device is in proximity of the charging device, the fourth magnet creates a second magnetic attraction force with the second pole of the second magnet, wherein
when the second charging surface of the portable device is placed adjacent to the first charging surface of the charging device, the second magnetic attraction force provides an additional magnetic force to cause the first coil charging area and the second coil charging area to be aligned, and wherein
the sizes of the third and fourth magnets are less than the size of the first and the second magnets.

15. The portable device of claim 11, wherein the first and the second magnets are located at a front portion of the first charging surface of the charging device and the third magnet is located at a respective front portion of the second charging surface of the portable device so that the first magnetic attraction force provides the anti-tip magnetic attraction force.

16. The portable device of claim 13, wherein the first and the second magnets are located at a front portion of the first charging surface of the charging device, the fourth and fifth magnets are located at a back portion of the first charging surface of the charging device, the third magnet is located at a respective front portion of the second charging surface of the portable device, and the sixth magnet is located at a respective back portion of the second charging surface of the portable device so that the first and second magnetic attraction forces and the first and second magnetic repulsion forces provide an increased magnetic steering torque to cause the first coil charging area and the second coil charging area to be aligned.

17. The portable device of claim 11, wherein the first, the second, and the third magnets are spherical magnets having diametrical magnetic fields, and wherein the first, the second, and the third magnets are neodymium magnets.

18. The portable device of claim 11, wherein one or more of the first and the second magnets are electromagnets.

19. The portable device of claim 11, wherein the size of the first magnet is less than the size of the second magnet so that the first magnetic attraction force is less than the first magnetic repulsion force.

20. A method, comprising:
in a charging device including:
a first induction coil configured to transmit power wirelessly to a portable device having a second induction coil;
a first charging surface including a first coil charging area defined by the first induction coil;
a first magnet having a first pole and a second pole and disposed at the first charging surface; and
a second magnet having a first pole and a second pole and disposed at the first charging surface,
creating, by the first pole of the first magnet, a first magnetic attraction force with a third magnet disposed at a second charging surface of the portable device, when the portable device is in proximity of the charging device;
creating, by the second pole of the second magnet, a first magnetic repulsion force with the third magnet; and
causing, by the first magnetic attraction force and the first magnetic repulsion force, the first coil charging area and a second coil charging area of the second charging surface to be aligned, when the second charging surface of the portable device is placed adjacent to the first charging surface of the charging device, wherein the second coil charging area defined by the second induction coil,
wherein the first magnetic attraction force provides an anti-tip magnetic attraction force when the portable device is adjacent to the first charging surface and a touch force is applied to a display portion of the portable device when the display portion is in an open position.

* * * * *